United States Patent

[11] 3,592,985

[72] Inventors Don J. Arneberg;
Joseph J. Gribble, both of Milwaukee, Wis.

[21] Appl. No. 9,206
[22] Filed Feb. 6, 1970
[45] Patented July 13, 1971
[73] Assignee Square D Company
Park Ridge, Ill.

[54] MECHANICAL INTERLOCK FOR TWO SWITCHES THAT ARE MOUNTED ON A COMMON SUPPORT
6 Claims, 7 Drawing Figs.

[52] U.S. Cl. .......... 200/50 C, 200/5 E
[51] Int. Cl. .......... H01h 9/20
[50] Field of Search .......... 200/50 C, 5 B, 5 E

[56] References Cited
UNITED STATES PATENTS
3,342,958 9/1967 Arneberg .......... 200/50 C

*Primary Examiner*—Robert K. Schaefer
*Assistant Examiner*—M. Ginsburg
*Attorneys*—Harold J. Rathbun and William H. Schmeling

ABSTRACT: An inexpensive mechanical interlock for two switches that are mounted on a common support plate. The interlock consists of a single member which is mounted in a space between the two switches when the switches are mounted adjacent to each other on the support plate. The member has a pair of bearing portions received in recesses in the adjacent walls of the switches and a pair of actuating portions that are engaged by inclined surfaces on portions of the movable contact carriers of the two switches to prevent a concomitant operation of the switches to a circuit closing position.

INVENTOR.
DON J. ARNEBERG
JOSEPH J. GRIBBLE
BY
William [signature]

INVENTOR.
DON J. ARNEBERG
JOSEPH J. GRIBBLE
BY

MECHANICAL INTERLOCK FOR TWO SWITCHES THAT ARE MOUNTED ON A COMMON SUPPORT

This invention relates to electric switches and is more particularly concerned with a mechanical interlock consisting of a single member which will prevent the concomitant operation of the switches to a circuit closing condition.

It is an object of the present invention to provide a simple, inexpensive mechanical interlock which will prevent the concomitant operation of a pair of switches to a circuit making condition.

An additional object is to prevent the concomitant operation of a pair of identical switches with a mechanical interlock that consists of a single-molded part.

A further object is to reduce both the number of parts and the cost of a mechanical interlock between two electric switches to a minimum by providing the interlocking function between the switches with a single member.

Another object is to mechanically interlock two switches that are mounted on a common support plate by a single-molded part which has a mounting portion positioned by the switches and the support plate so an interfering portion of the part moves into an interferring position with portions of one of the two switches when the other of the two switches is actuated.

Further objects and features of the invention will be readily apparent to those skilled in the art from the specification and appended drawings illustrating certain preferred embodiments in which.

Figure 1:
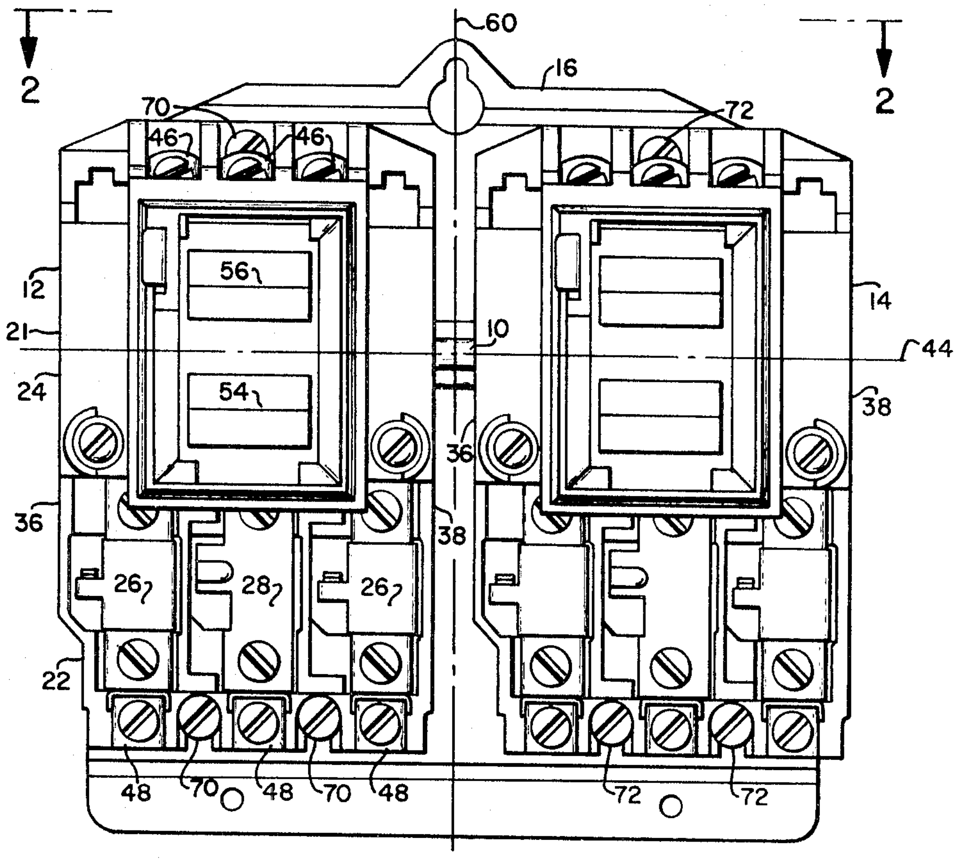
FIG. 1 is a front elevational view of an assembly including a pair of switches mounted on a common support and a mechanical interlock incorporating the features of the present invention.
Figure 2:
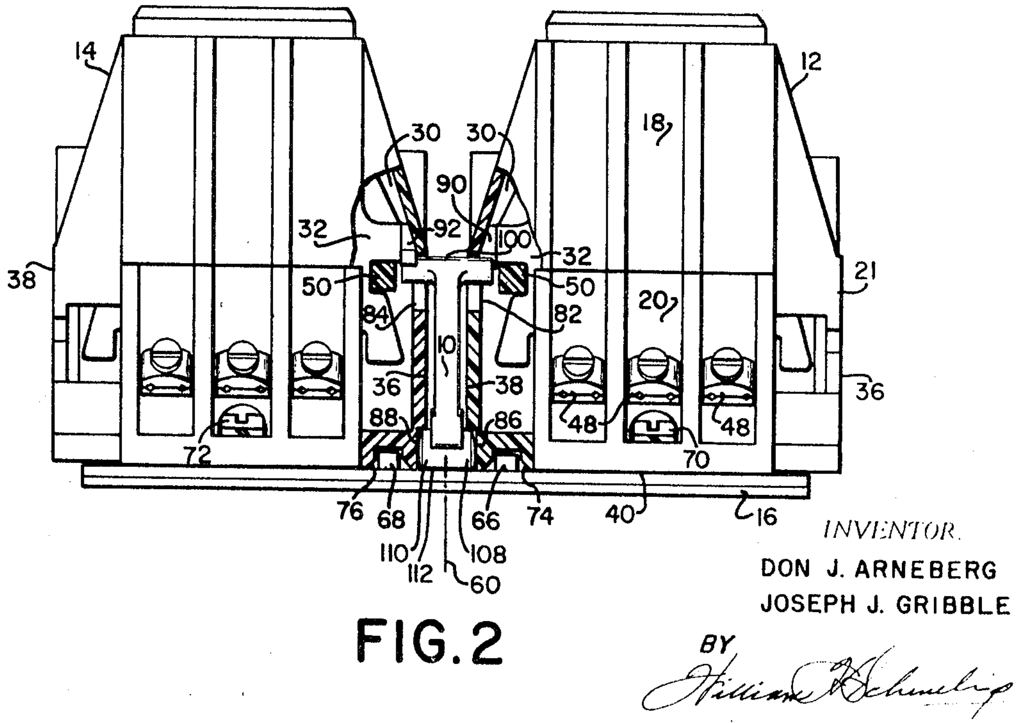
FIG. 2 is an end view taken in the direction of the arrows 2–2 in FIG. 1 with portions of the switches shown in cross section.
Figure 3:
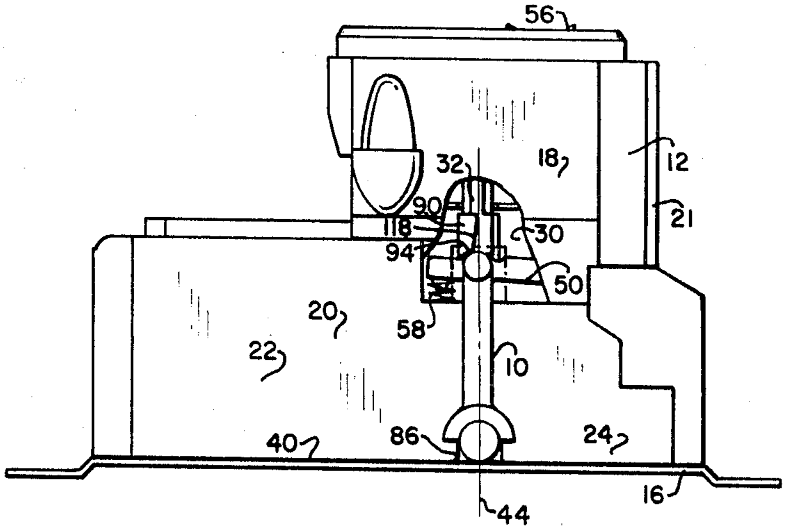
FIG. 3 is a side elevational view of one of the pair of switches in FIG. 1 mounted on the support plate with a portion of a wall of the switch broken away and showing the mechanical interlock in FIG. 1.
Figure 4:
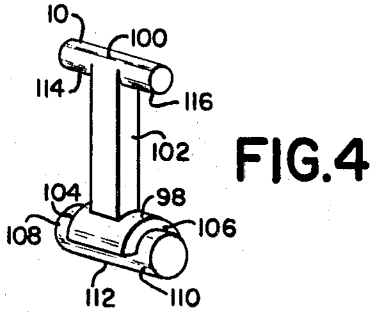
FIG. 4 is a perspective view of the single member which interlocks the switches in FIG. 1.

Referring to the drawings, the numeral 10 designates a mechanical interlock member. The interlock member is positioned between a pair of manually operable switches 12 and 14 when the switches are positioned on a support plate 16 to prevent the concomitant operation of the switches 12 and 14. The switches 12 and 14 are preferably of the type disclosed in application for U.S. Pat., Ser. No. 9203, which has been filed by the inventor Jordan F. Puetz concurrently herewith and has been assigned to the assignee of the present application. As the switches 12 and 14 are identical, only the switch 12 will be described, it being understood that the designations supplied to the components of the switch 12 are equally applicable to the corresponding components of the switch 14. The switch 12 includes an upper section 18, and a lower section or base 20, which are secured together to provide a housing 21 for the switch. The base 20 is arranged to be mounted on the plate 16, as will be hereinafter described, and is formed of a single-molded part to provide a pair of sections 22 and 24, each of which is suitably compartmented. The compartments within the section 22 each is arranged to receive a solder type current responsive unit that has a heater unit connected in series with a circuit to be monitored and a ratchet wheel which is held stationary when the current flow through the heating element does not exceed a predetermined value and which is released to rotate upon excessive current flow through the unit. The current responsive units in the left- and right-hand compartments in the switch 12 in FIG. 1 are designated by a numeral 26. The central compartment of the switch 12 is provided with a dummy unit 28. The unit 28 replaces a current responsive type unit 26 and merely acts as a conductor and is not responsive to current flow through the circuit. If desired, the central compartment may also be supplied with a current responsive type unit 26. The release of a ratchet wheel of any one of the current responsive units 26 will cause a slider, not shown, to move within the section 22 and thereby cause a trip mechanism within the switch 12 to operate and a movable contact carrier within the switch 12 to be moved to a position wherein the movable contacts of the switch 12 are separated from the stationary contacts to interrupt the circuit therebetween. The upper section 18 and the section 24 enclose an internal cavity 30 wherein a movable contact carrier 32, a toggle mechanism, not shown, and a plurality of pairs of stationary contacts 42 of the switch 12 are included.

The housing 21 has sidewalls 36 and 38 extending in planes parallel to each other and a bottom wall 40 extending perpendicular to the sidewalls 36 and 38. The plurality of compartments within the section 24 extend parallel to the sidewalls 36 and 38 and forwardly of the bottom wall 40. Each of the compartments within the section 24 includes a pair of stationary contacts that are spaced equidistantly on opposite sides of a plane extending through a centerline 44. The stationary contacts 42 at one side of the centerline 44 are each connected to a terminal member 46. The terminal members 46 are spaced along an upper wall of the switch 12. The stationary contacts 42 on the other side of the centerline 44 are electrically connected through the respective current responsive units 26 and the dummy unit 28 to terminal members 48 located in spaced relation to each other along a bottom wall of the switch 12. The movable contact carrier 32 is positioned within the cavity 30 by portions of the housing and a stabilizing bar 50 so as to be guided for movement in a linear path along an axis that extends in a plane through the centerline 44 which is normal to the sidewalls 36 and 38 and the bottom wall 40. The movable contact carrier 32 provides a support for a plurality of movable contacts 52 each of which is arranged to engage and bridge one of the pairs of the respective pairs of stationary contacts 42 within the compartments in the base 20. The carrier 32 is movable between positions wherein the movable contacts 52 are separated from the stationary contacts 42 to a position wherein the movable contacts 52 bridge the stationary contacts 42 so as to complete a circuit therebetween. The movement of the contact carrier 32 is caused by the actuation of a toggle mechanism, not shown, which is actuated in response to the operation of an OFF button 54 and an ON button 56. The buttons 54 and 56 are externally accessible from the front surface of the upper section 18. When the OFF button 54 is depressed within the upper secton 18, the levers of the toggle mechanism will be positioned so the contact carrier 32 is moved by the force exerted by a pair of springs 58 which react on the stabilizing bar 50 so the carrier 32 is positioned so that the movable contacts 52 are separated from the stationary contacts 42 and interrupt the circuit between the stationary contacts 42. When the ON button 56 is depressed within the upper section 18, the levers of the toggle mechanism will cause the contact carrier 32 to move toward the bottom wall 40 against the force supplied by the springs 58 in a plane defined by the centerline 44 to a position wherein the movable contacts 52 bridge the respective pairs of stationary contacts 42 so as to close a circuit between the stationary contacts 42.

The plate 16 is symmetrical about a vertical centerline 60 and includes three threaded openings 62 perit in the plate 16 to the left of the centerline 60 and a set of threaded openings 64 located in the plate 16 to the right of the center line 60. The plate 16 also includes a pair of projections 66 on the left side of the centerline 60 and a pair of projections 68 on the side of the plate to the right of the centerline 60. The base 20 of the switch 12 has suitably located openings which are aligned with the threaded openings 62 which will permit screws 70 to secure the switch 12 to the plate 16. Similarly, the switch 14 has suitably located openings in its base to receive screws 72. The screws 72 are threaded into the openings 64 to secure the switch 14 to the plate 16. Each of the switches 12 and 14 has a pair of recesses in its bottom wall 40. The recesses in the switches 12 and 14 are respectively indicated by numerals 74 and 76 and are located in the bottom 40 to receive the projections 66 and 68 respectively to position the switches 12 and 14 on the plate 16 so that the sidewall 38 on the switch 12 extends parallel to and is spaced a predetermined distance from the sidewall 36 on the switch 14. The sidewalls 38 and 36 on the switches 12 and 14 are equidistantly spaced on opposite sides of the centerline 60 when the switches 12 and 14 are mounted on the plate 16. The sidewalls 38 and 36 have windows 82 and 84 therein. The windows 82 and 84 are centered on the centerline 44 so as to expose portions of the movable contact carriers 32 in the respective switches 12 and 14 to the area between the switches when the switches 12 and 14 are mounted on the plate 16.

Included in the respective sidewalls 36 and 38 of each of the switches 12 and 14 are recesses 86 and 88. Each of the recesses 86 and 88 is centered along the centerline 44 and extends from the bottom wall 40 of the respective switches 12 and 14 to a portion that has a hemiscylindrical shape and is spaced from the bottom wall 40. The exposed portion of the carriers 32 adjacent windows 84 and 82 in the sidewalls 36 and 38 of each of the switches 12 and 14 is provided with a projection. The projection on the contact carrier 32 of the switch 12 adjacent the sidewall 38 of the switch 12 is designated by a numeral 90. The projection on the contact carrier 32 of the switch 14 adjacent the sidewall 36 of the switch 14 is designated by a numeral 92. It is understood that portions of the carriers 32 adjacent the sidewalls 36 and 38 of the respective switches 12 and 14 have projections, which are not shown, and are similar to the projections 92 and 90 on the respective switches 14 and 12.

Each of the projections 90 and 92 on the respective switches 12 and 14 respectively have a camming surface 94 and 96. The camming surfaces 94 and 96 on the adjacent switches 12 and 14 are located on opposite sides of the common plane extending through the centerline 44 and are inclined to face the plate 16. The camming surface 94 on the projection 90 is inclined so that the portion thereof most proximate the support plate 16 is remote from the plane defined by the centerline 44. Similarly, the camming surface 96 on the projection 92 is inclined so that the portion thereof most proximate the support plate 16 is most remote from the plane defined by the centerline 44. Thus the camming surface 94 faces the upper end of the switch 12 and the camming surface 96 faces the lower end of the switch 14. The camming surfaces 94 and 96 are located on the carriers 32 of the adjacent switches 12 and 14 to be exposed through the windows 82 and 84 in the walls 38 and 36.

The interlocking member 10 is formed as a unitary part, preferably of molded material, to have a pivot portion 98, an actuating portion 100 and an arm portion 102 which interconnects the pivot portion 98 and the arm portion 102. The pivot portion 98 includes a pair of oppositely facing shoulders 104 and 106, a pair of cylindrical bearings 108 and 110 which extend in opposite directions from the free ends of the pivot portions, and a cylindrical surface 112 which is located intermediate the bearings 108 and 110 on the side opposite of the pivot portion 98 from which the arm portion 102 extends. The interlocking member 10 is positioned between the switches 12 and 14 when the switches 12 and 14 are secured to the plate 16 by the screws 70 and 72 to have the bearings 108 and 110 received in the recesses 86 and 88 so as to engage the hemispherically shaped portion of the recesses 86 and 88 while the cylindrical surface 112 rests on portions of the forward surface of the plate 16. The interlock member 10 is thus held captive by the assembled switches 12 and 14 and the plate 16. The arm portion 102 extends to align the actuating portion 100 with the windows 82 and 84 when the pivot portion 98 is mounted between the switches 12 and 14. The actuating portion 100 has a pair of cylindrically shaped arms 114 and 116 projecting in opposite directions from the arm portion 102. The arms 114 and 116 are arranged to extend through the windows 82 and 84 to respectively engage the inclined surfaces 94 and 96.

Figures 5, 6, 7:
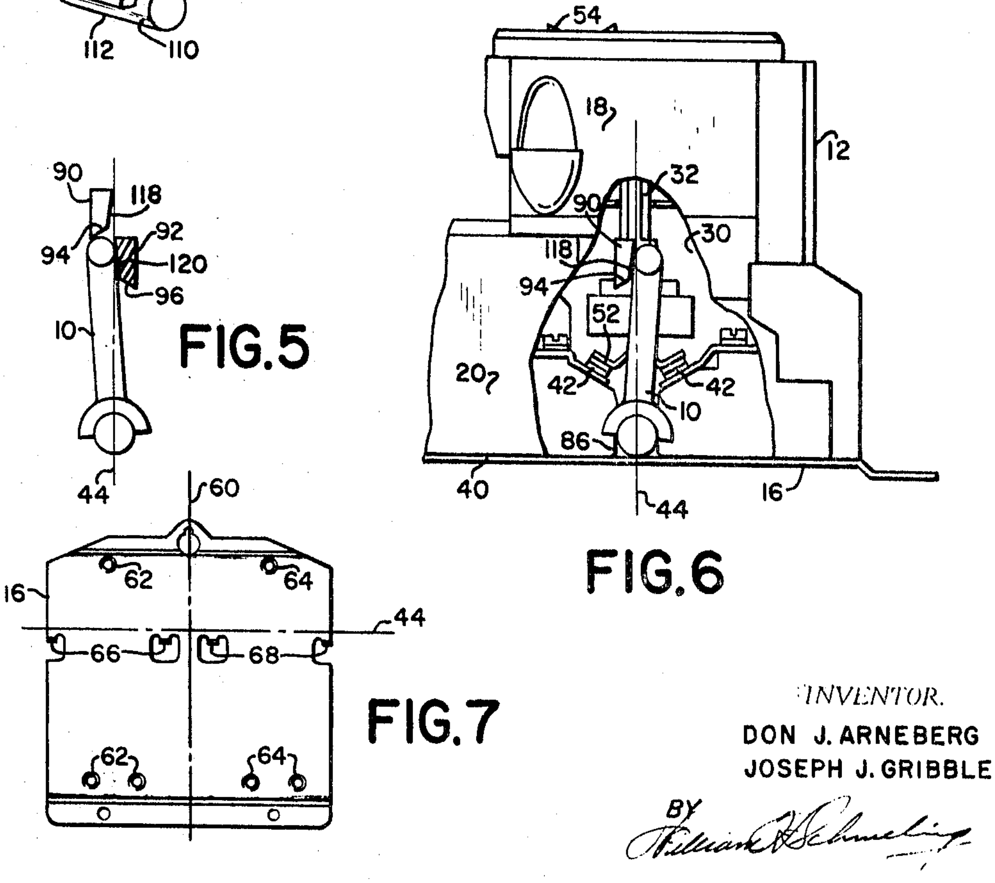
FIG. 5 is an elevational view of the interlock member in FIG. 4, functionally illustrating the manner by which portions of the switches in FIG. 1 are interlocked.
FIG. 6 is a fragmentary view of the structure shown in FIG. 3, with a portion of the sidewall of the switch broken away to illustrate certain components of the switch in their actuated positions.
FIG. 7 is a front elevational view showing the support plate in FIG. 1 in reduced size.

As was previously indicated, the operation of the buttons 56 of either of the switches 12 or 14 will cause the contact carriers 32 associated therewith to move toward the plate 16 so that the contact carrier 32 associated with the activated switch will cause the inclined surfaces 94 or 96 to move toward the plate 16. For example, in the event that switch 12 is actuated while the switch 14 is deactivated, the contact carrier 32 in the switch 12 will cause the surfaces 94 to move toward the plate 16 and thereby engage the arm 114 and rotate the interlock member 10 in a clockwise direction, as in FIG. 5, so that the arm 116 is aligned with the surface 96 to prevent downward movement of the carrier 32 in the switch 14 and thereby prevent the operation of the switch 14 to its activated condition. Conversely, if switch 14 is initially operated while the switch 12 is deactivated, the inclined surfaces 96 will engage the arm 116 and cause the interlock member 10 to rotate counterclockwise in FIG. 5 to a position where it will block the downward movement of the contact carrier 32 in switch 14 because of the potential engagement between the arm 114 and the inclined surface 94 so as to prevent the concomitant operation of the switch 12 when the switch 14 is actuated. Thus the interlock 10 provides an inexpensive structure which will prevent the concomitant operation of the switches 12 and 14 when the switches 12 and 14 are mounted on the common support plate 16.

The projections 90 and 92 are respectively provided with inclined surfaces 118 and 120. The surfaces 118 and 120 face each other and are located on opposite sides of the common plane extending through the centerline 44. The inclined surfaces respectively extend from the camming surfaces 94 and 96 so as to be engaged by portions of the arms 116 when the respective switches 12 and 14 are operated. The inclined surfaces 118 and 120 will prevent jamming of either of the switches 12 or 14 in an actuated position. Thus if the switch 12 is actuated while the switch 14 is deactivated, the surface 94 will have moved the interlock member 10 in a clockwise direction so that the inclined surface 118 is aligned with the arm 114 while the arm 116 is aligned with the surface 96 to prevent downward movement of the carrier 32 in the switch 14. In the event an attempt is made to simultaneously deactivate the switch 12 and actuate the switch 14, the inclined surface 118 will permit the carrier 32 in the switch 12 to move toward the deactivated position because of the direction of forces which occur between the inclined surface 118 and the arm 114 when the arm 114 is forced toward the surface 118 as the surface 96 is urged into engagement with the arm 116. It is apparent the surface 120 similarly will permit the movement of the carrier 32 in the switch 14 to its deactivated position when an attempt is made to simultaneously actuate the switches 12 and 14 to their actuated and deactuated positions. Thus the inclined surfaces 118 and 120 will cause the interlock member 10 to operate with a jam-free action.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What we claim is:

1. An assembly comprising: a pair of switches positioned side-by-side in spaced relation on a support plate with each of the switches including: an insulating housing having a pair of spaced sidewalls, a bottom wall extending between the sidewalls, a contact carrier movable between two positions in a cavity in the housing between the sidewalls along a plane that extends normal to the two sidewalls and the bottom wall; said assembly also comprising means including cooperating recesses and projections in the bottom walls of both switches and the support plate for locating and mounting the switches adjacent to each other on the support plate so the planes of movement of the contact carriers in the respective two switches extend in a common plane and the switches have spaced and parallel adjacent sidewalls; a bearing recess in the adjacent sidewall of each switch located adjacent the support plate and centered in the common plane, a window in the adjacent sidewall of each switch centered in the common plane and exposing a portion of the movable contact carrier to the space between the switches, a surface located on the exposed portion on each contact carrier disposed so that the surfaces on the adjacent switches are on opposite sides of the common plane and are inclined to face the support plate so that the portion of the surface that is most proximate the support plate is most remote from the common plane and a mechanical interlocking member consisting of a unitary member disposed between the adjacent switches.

2. The assembly as recited in claim 1 wherein said holding means also comprising a portion of the support plate.

3. The assembly as recited in claim 2 wherein the unitary member is moved in one direction of rotation in response to the movement of the contact carrier of one of the two switches from a first to a second of said two positions and in a direction opposite the said one direction in response to the movement of the contact carrier of the second of the two switches from a first to a second of said two positions.

4. The assembly as recited in claim 2 wherein the interlocking member includes a portion that is engageable with portions of the adjacent sidewalls of the switches that surround the recesses for positioning the unitary member between the switches.

5. The assembly as recited in claim 4 wherein each of the recesses includes a portion having a hemispherical shape and the bearing portions have a cylindrical shape and are journaled in the hemispherical portions.

6. The assembly as recited in claim 5 wherein the actuating portion of the interlocking member has a cylindrical shape.

PO-1050
(5/69)

UNITED STATES PATENT OFFICE
CERTIFICATE OF CORRECTION

Patent No. 3,592,985 Dated July 13, 1971

Inventor(s) Don J. Arneberg and Joseph J. Gribble

It is certified that error appears in the above-identified patent and that said Letters Patent are hereby corrected as shown below:

Col. 2, true line 69 (appearing as line 71), cancel "perit" and insert --located--.
Col. 5, line 9, cancel the semicolon ";" and insert a comma --,--; line 21, as entered by Examiner's amendment, cancel the period "." and insert --,said interlocking member having bearing portions on one end and an actuating portion on an end opposite the said one end, said actuating portion extending through the windows and engaging the inclined surfaces of the adjacent switches, and means holding captive said interlocking member for rotation comprising said bearing recesses receiving said bearing portions.--

Signed and sealed this 4th day of January 1972.

(SEAL)
Attest:

EDWARD M.FLETCHER,JR.
Attesting Officer

ROBERT GOTTSCHALK
Acting Commissioner of Patents